Jan. 12, 1943.  F. KOVACS  2,308,467
PNEUMATIC TIRE STRUCTURE
Filed Feb. 7, 1941  3 Sheets-Sheet 2
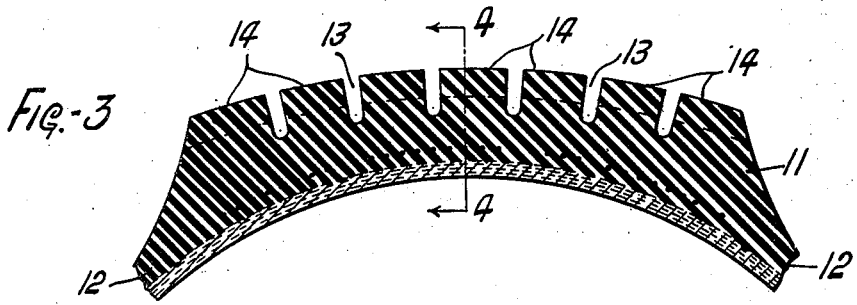
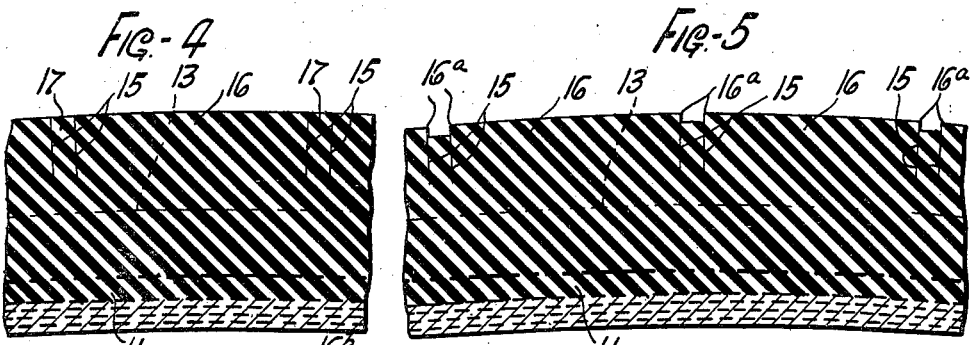
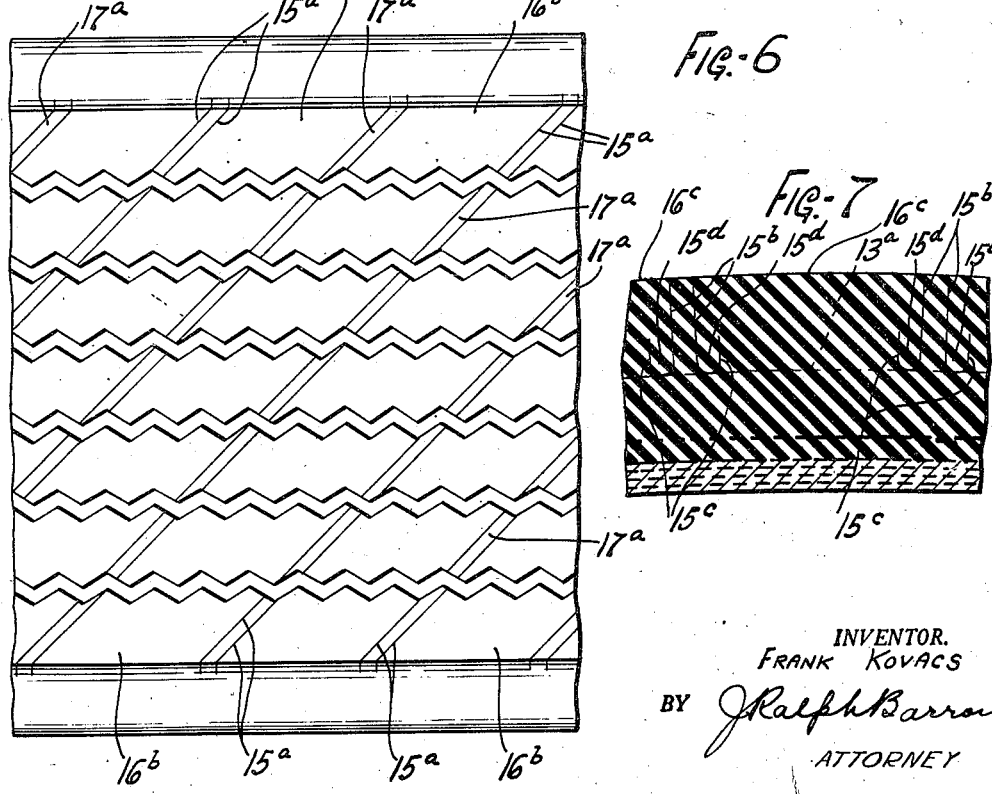
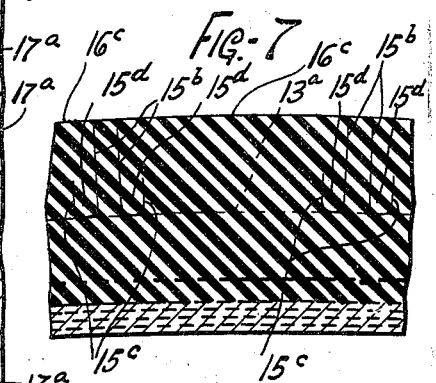
INVENTOR.
FRANK KOVACS
BY J. Ralph Barron
ATTORNEY Jan. 12, 1943.                F. KOVACS                2,308,467
                        PNEUMATIC TIRE STRUCTURE
                         Filed Feb. 7, 1941          3 Sheets—Sheet 3
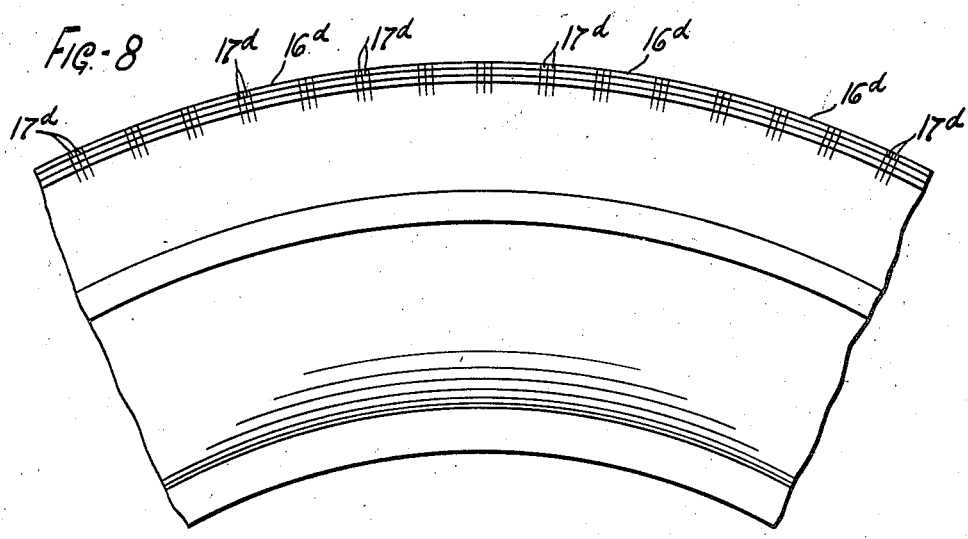
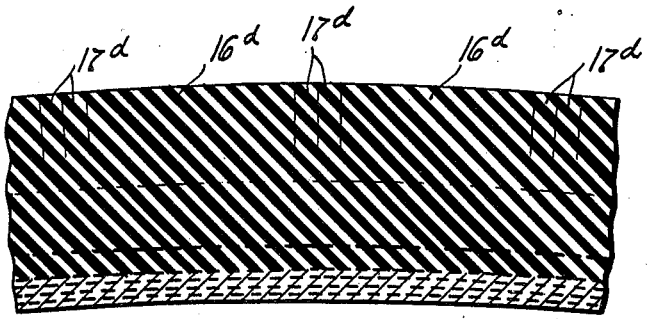
INVENTOR.
FRANK KOVACS
BY J. Ralph Barrow
ATTORNEY Patented Jan. 12, 1943

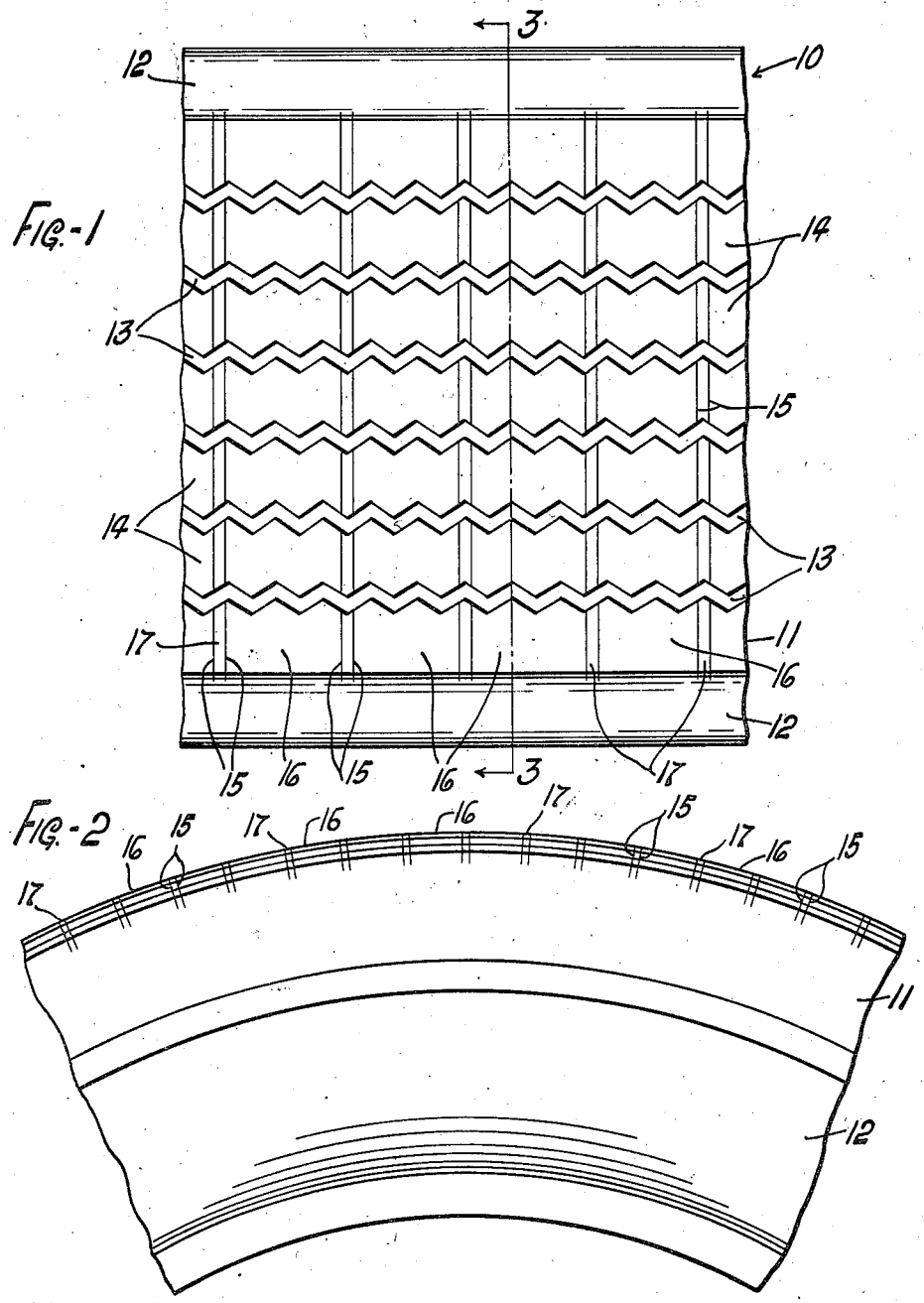

2,308,467

UNITED STATES PATENT OFFICE 2,308,467

PNEUMATIC TIRE STRUCTURE

Frank Kovacs, Akron, Ohio, assignor to Seiberling Rubber Company, Barberton, Ohio, a corporation of Delaware Application February 7, 1941, Serial No. 377,778

2 Claims. (Cl. 152—209)

This invention relates to pneumatic tires, and in particular relates to pneumatic tires having tread portions including circumferentially extending ribs or projections.

Pneumatic tires, provided with continuous ribs on the treads, in general give satisfactory results from the standpoint of resistance to wearing, but many attempts have been made in the past to improve these from the standpoint of non-skidding or traction as by slitting or grooving such ribs. These attempts have generally resulted in somewhat improved traction and anti-skid qualities, but at a sacrifice to wearing qualities of the tire.

A chief object of this invention is to provide a tire structure of the character described in which circumferential ribs are grooved or slitted in such a manner as to provide transverse flexible webs to increase non-skidding qualities of the tire during the first stages of tread wear while preserving the advantages of continuous rib tires relating to anti-skid and traction qualities, quietness, non-excessive flexing, uniform tread wear, etc., and in which structure the gradual wearing away of the transverse webs in the tread will result in additional non-skid edges, but always with the rubber in the ribs buttressed against excessive flexing and wiping action with resulting wear.

Stated in another way, the chief object of the invention is to provide a tire structure which will have the desired advantages of continuous ribs and which as the tire tread wears will continuously maintain transverse free non-skid edges, but so buttressed as to prevent excessive wear.

These and other objects of the invention will be manifest from the following brief description and the accompanying drawings.

Of the accompanying drawings:

Figure 1 is an edge view of a portion of a pneumatic tire embodying the invention.

Figure 2 is a side elevation, on a reduced scale, of the tire shown in Figure 1.

Figure 3 is a fragmentary cross-section of the tread portion of the tire, taken substantially on the line 3—3 of Figure 1.

Figure 4 is an enlarged fragmentary cross-section taken substantially on line 4—4 of Figure 3.

Figure 5 is a view, similar to Figure 4, illustrating the tread after it has started to wear.

Figure 6 is a view similar to Figure 1, illustrating a modified form of the invention.

Figure 7 is a cross-section similar to Figure 4, illustrating another modified form of the invention.

Figures 8 and 9 are views similar to Figures 2 and 4, respectively, illustrating still another form of the invention.

Referring particularly to Figures 1 to 5 there is shown a standard type of tire which comprises the usual fabric carcass or casing 10 on which is formed the usual rubber tread portion 11 and side walls 12. The tread portion 11 may be formed with a series of circumferential grooves 13, 13 dividing the tread into a plurality of transversely spaced continuous ribs 14, 14, which may have serrated or saw tooth non-skid edges. The height of the ribs 14, determined by the depth of the grooves 13, and the width of the ribs are such that, in the relatively new and unworn tire, the ribs will be sufficiently stiff as to prevent excessive flexing and wiping action resulting in rapid wear.

In accordance with the present invention the ribs 14 may be provided with circumferentially spaced pairs of substantially parallel slits or grooves 15, 15 extending inwardly of the tire, at an angle to the ground-engaging surface thereof, to improve the non-skid and traction qualities thereof. The pairs of slits or grooves in the respective ribs may extend in lines transversely across a tire tread, to facilitate the slitting or cutting operations, which may be performed in any suitable manner either during or subsequent to vulcanization of the tire.

The spacing of the slits or grooves 15 in each pair is substantially narrower than the width of the respective ribs to provide transverse flexible webs 17 and the distance between pairs of slits is substantially greater than the width of the ribs. This provides in the ribs series of relatively thin flexible webs or tongues 17, 17 separated by relatively long unslit rib portion 16, 16. The relative spacings between the webs 17, defined by the pairs of slits or grooves 15, are varied in known manner about the periphery of the tire to avoid periodicity and therefore traction noise when the tire is in use.

In use the slitted tire described above, during the first stages of wear, has increased non-skid action due to the flexing action of the transverse webs 17 the free edges of which are flexed into ground-gripping contact. Due to the flexing and wiping action on these webs during initial wear of the tire portions 16 of the ribs become, in effect, like tread buttons having free edges 16ª, because the webs 17 wear faster than rib portions 16. Thereafter, during continued wear of the tire, free edges 16ª are maintained, but along with the buttressing action of the web between portions 16. The webs 17, however, act as buttresses for the buttons 16 at all times to prevent excessive flexing thereof (see Figures 4 and 5).

The slits or grooves 15 may be formed in the ribs so as to extend only a fraction of the height of the ribs into the surface of the tire to avoid cracking, and the tire tread may be re-slit or re-grooved as shown when it wears down to the bottoms of the slits or grooves.

Figure 6 illustrates a modified form of tire structure, embodying the invention, which is substantially the same as the tire described above in all respects except that the closely spaced pairs of radial slits 15$^a$, 15$^a$, forming thin, flexible webs 17$^a$, 17$^a$, are arranged diagonally across the tread. With this construction the results obtainable will be as before except that there will be somewhat greater flexing or wiping action in the buttons 16$^b$, 16$^b$, formed between the pairs of slits, due to the diamond shapes of the buttons resulting from the diagonal slitting. The degree of flexing or wiping action obtainable, therefore, may be controlled by the transverse direction or angle of the slits.

In Figure 7 is shown another modified form of the invention, which is substantially the same as the tire structure shown in Figures 1 to 5 (see Figure 4), except that closely spaced pairs of slits 15$^b$, 15$^b$ extend to the full depths of the circumferential grooves 13$^a$, and are provided with hook-like or J-shaped portions 15$^c$, 15$^c$ turned radially outwardly of the tire in directions outwardly opposite to each other, the edges of the hooks terminating in inwardly spaced relation to the ground-engaging surface of the tire. The wearing and flexing action in the tire tread structure last described will be substantially the same as that described in connection with Figures 1 to 5, until the tread rubber wears down to the terminal ends of the hook-like portions 15$^c$, when the blocks of rubber 15$^d$ embraced by the hooked portions will become displaced from the tire. This will provide additional non-skid grooves and edges, as well as increase the flexibility of the worn projections 16$^c$, during later stages of wear of the tread. Such tires require no re-slitting or re-grooving operations and crack propagation is prevented at the bottoms of the slits by the curvature thereof.

As shown in Figures 8 and 9 the slits or grooves may be arranged in groups of three or more to form two or more relatively thin, flexible webs or tongues 17$^d$, 17$^d$ between rib portions 16$^d$, the width and spacing of the webs with respect to the width of the ribs in the original or unworn tire being substantially as described above in connection with Figures 1 to 5, in particular.

Other modifications of the invention may be resorted to without departing from the spirit thereof or the scope of the appended claims.

What is claimed is:

1. A pneumatic tire having a tread including one or more circumferential ribs or projections provided with circumferentially spaced pairs of slits extending inwardly at an angle to the ground-engaging surface of the tire, said pairs of slits defining alternate buttons and webs in the ribs, said buttons being substantially longer circumferentially than the width of the ribs and said webs being substantially thinner circumferentially than the width of the ribs, whereby said webs will have greater flexing and wiping action than said buttons but excessive flexing and wiping action being prevented by the webs being buttressed between the buttons.

2. A pneumatic tire having a tread including one or more circumferential ribs or projections provided with circumferentially spaced slits extending inwardly at an angle to the ground-engaging surface of the tire, said slits defining alternate buttons and webs in the ribs, said buttons being longer circumferentially than the width of the ribs or projections, and said webs being thinner circumferentially than the width of the ribs or projections, whereby said webs will have greater flexing and wiping action than said buttons but excessive flexing and wiping action being prevented by the webs being buttressed between the buttons.

FRANK KOVACS.